(12) United States Patent
Honbo et al.

(10) Patent No.: US 7,083,876 B2
(45) Date of Patent: Aug. 1, 2006

(54) LEAD-ACID BATTERY

(75) Inventors: Kyoko Honbo, Hitachinaka (JP); Eiji Hoshi, Hitachi (JP); Yasushi Muranaka, Hitachinaka (JP); Seiji Takeuchi, Hitachiota (JP)

(73) Assignees: Hitachi, Ltd., Tokyo (JP); Shin-Kobe Electric Machinery Co., Ltd., Tokyo (JP)

( * ) Notice: Subject to any disclaimer, the term of this patent is extended or adjusted under 35 U.S.C. 154(b) by 94 days.

(21) Appl. No.: 10/096,505

(22) Filed: Mar. 13, 2002

(65) Prior Publication Data

US 2003/0049528 A1    Mar. 13, 2003

(30) Foreign Application Priority Data

Apr. 3, 2001 (JP) .............................. 2001-104080

(51) Int. Cl.
*H01M 4/02* (2006.01)
*H01M 4/88* (2006.01)

(52) U.S. Cl. ...................... 429/209; 429/232; 429/225; 252/182.1

(58) Field of Classification Search ................ 429/232, 429/209, 206, 212, 225, 245, 231.8; 252/182.1
See application file for complete search history.

(56) References Cited

U.S. PATENT DOCUMENTS

| | | | | |
|---|---|---|---|---|
| 4,589,999 | A | * | 5/1986 | Vasta ........................ 252/511 |
| 5,156,935 | A | * | 10/1992 | Hohjo et al. ................ 429/225 |
| 5,667,917 | A | | 9/1997 | Edwards et al. |
| 6,187,475 | B1 | * | 2/2001 | Oh et al. .................... 429/205 |
| 6,665,171 | B1 | * | 12/2003 | Takamuka et al. .......... 361/508 |

FOREIGN PATENT DOCUMENTS

| | | |
|---|---|---|
| CN | 1113352 | 12/1995 |
| JP | 54137478 | 10/1979 |
| JP | 59151963 | 8/1984 |
| JP | 59160584 | 9/1984 |
| JP | 60183086 | 9/1985 |
| JP | 02234352 | 9/1990 |
| JP | 5-89873 | 4/1993 |
| JP | 9-213336 | 8/1997 |
| JP | 11135127 | 5/1999 |
| JP | 2001009286 | 1/2001 |
| SU | 1796245 | 2/1993 |

OTHER PUBLICATIONS

"Effects of Additives on the Discharge Behavior of Positive Electrodes in Lead/Acid Batteries," Suqin Wang et al., *Journal of Power Sources*, vol. 55, No. 1, May 1, 1995, pp. 47-52.

* cited by examiner

*Primary Examiner*—Raymond Alejandro
(74) *Attorney, Agent, or Firm*—Dickstein Shapiro Morin & Oshinsky LLP

(57) ABSTRACT

A lead-acid battery superior in high-efficiency charging characteristic to conventional lead-acid batteries and a carbon material used in the lead-acid battery having excellent charge acceptability are disclosed. The lead-acid battery uses, as an additive to the anode active material, a simple substance and/or compound thereof, both having a catalysis for desulfurization or a catalyst for $SO_x$ oxidation by adding to, or loading on, a carbon material such as active carbon, carbon black, or the like. When the lead-acid battery with an anode containing carbon material is applied to electric cars, various hybrid cars, power storage systems, elevators, electromotive tools and power source systems such as uninterruptible power source, distributed power source and the like, all having high input and output requirements, stable control can be obtained.

5 Claims, 5 Drawing Sheets

LEAD-ACID BATTERY

BACKGROUND OF THE INVENTION

1. Field of the Invention

The present invention relates to a lead-acid battery, particularly a carbon material for a lead-acid battery superior in high-efficiency charging characteristic.

2. Related Art Statement

A lead-acid battery as a secondary battery is relatively inexpensive and has stable properties; therefore, has been widely used as an electric source for automobiles and portable apparatuses, or as a back-up electric source for computers. Recently, a lead-acid battery has found new applications as a main electric source for electric cars, as an electric source for start-up of hybrid electric cars and simple hybrid cars, or for recovery of regenerated current. In these new applications, a lead-acid battery need to have, in particular, both of high output characteristic and high input characteristic.

Various studies have heretofore been made on the high output characteristic. With respect to the high input characteristic, however, there has been obtained no level which is superior to those of other battery systems.

The high input characteristic, i.e. high-efficiency charging characteristic of a lead-acid battery is greatly influenced by the characteristics of the lead sulfate present in the anode. With respect to the anode active material of a lead-acid battery, metallic lead emits electrons and is converted into lead sulfate in the discharge reaction; in the charging reaction, lead sulfate accepts electrons and is converted into metallic lead. The lead sulfate generated during discharge has neither ionic conductivity nor electron conductivity and is an insulating material. Further, the lead sulfate is very low in solubility into lead ion. Thus, lead sulfate is low in electron or ionic conductivity and moreover low in solubility into lead ion; therefore, the rate of reaction from lead sulfate into metallic lead is small, resulting in inferior high-efficiency charging characteristic.

As countermeasure therefor, improvements of charging characteristic have been tried, for example, by optimizing the amount of carbon added into an anode active material (JP-A-9-213336) or by allowing an anode active material to contain metallic tin (JP-A-5-89873).

OBJECT OF THE INVENTION

In order to obtain an improved high-efficiency charging characteristic, the properties of lead sulfate need be improved. That is, it is necessary to firstly improve the conductivity of lead sulfate and secondly increase the solubility of lead sulfate into lead ion. The improvement of the electron conductivity and ionic conductivity of lead sulfate is possible by addition of an optimum amount of carbon, as seen in JP-A-9-213336. With this addition of an optimum amount of carbon, however, it is impossible to improve the solubility of lead sulfate into lead ion. Similarly, by allowing an anode active material to contain metallic tin, the conductivity improvement of lead sulfate is possible but the improvement of solubility of lead sulfate into lead ion is impossible.

The objects of the present invention are to provide a lead-acid battery of superior high-efficiency charging characteristic wherein the conductivity of lead sulfate is improved and further the solubility of lead sulfate into lead ion is improved and thereby the charging reaction of anode active material proceeds smoothly, and a novel carbon material superior in charge acceptability.

SUMMARY OF THE INVENTION

Firstly, the lead-acid battery of the present invention is characterized in that a carbon powder containing a simple substance and/or a compound, both having a catalysis for desulfurization or $SO_X$ oxidation is added into the anode. The carbon material for a lead-acid battery according to the present invention is characterized by being a carbon powder containing a simple substance and/or a compound, both having a catalysis for desulfurization or $SO_X$ oxidation. Use of such a carbon powder can give a lead-acid battery of improved high-efficiency charging characteristic. The high-efficiency charging characteristic of a lead-acid battery is improved strikingly when a carbon containing a simple substance and/or a compound, both having, in particular, a catalysis for hydrogenation desulfurization is added.

When the simple substance and/or the compound, both having a catalysis for desulfurization is at least one major component constituting catalysts for desulfurization or deodorization selected from catalysts for petroleum refining, catalysts for fuel oil desulfurization, catalysts for gas production and catalysts for pollution control, the resulting lead-acid battery can have a further improved high-efficiency charging characteristic.

The above component is desirably at least one simple substance selected from Co, Mo, Ni, Zn, Cu and Mn, or at least one oxide, sulfate or hydroxide thereof.

Also when the simple substance and/or the compound, both having a catalysis for $SO_X$ oxidation is at least one major component constituting catalysts for sulfuric acid production, the resulting lead-acid battery can have an improved high-efficiency charging characteristic. A simple substance or compound which can be converted into a sulfate, is preferred particularly.

The above component is desirably at least one simple substance selected from alkali metals, alkaline earth metals, V, Mn and rare earth elements, or at least one oxide or sulfate thereof.

Secondly, the lead-acid battery of the present invention is characterized in that the following loaded material is added into the anode. That is, there is added, into the anode, a loaded material obtained by loading, on a carbon powder, at least one simple substance selected from Hf, Nb, Ta, W, Ag, Zn, Ni, Co, Mo, Cu, V, Mn, Ba, K, Cs, Rb, Sr and Na, desirably from Ni, Co, Mo, Cu, V, Mn, Ba, K, Cs, Rb, Sr and Na, or at least one oxide, sulfate, hydroxide or carbide thereof. By using such a loaded material, the resulting lead-acid battery can have an improved high-efficiency charging characteristic.

When said at least one element is loaded on the carbon in an amount of 10 to 5,000 ppm, desirably 50 to 1,000 ppm by weight per element, the resulting lead-acid battery can have a further improved high-efficiency charging characteristic.

In the present lead-acid battery, by using, as the carbon, at least one member selected from carbon black, acetylene black, natural graphite, artificial graphite, pyrolytic carbon, coke, isotropic graphite, mesophase carbon, pitch-based carbon fiber, carbon fiber by vapor phase growth, carbon fluoride, nanocarbon, active carbon, active carbon fiber and PAN-based carbon fiber, a superior high-efficiency charging characteristic can be obtained. Some of these carbons have various primary particle diameters, various specific surface areas, various oil absorptions as measured with dibutyl phthalate, or various apparent densities, but the present invention is applicable to all of these carbons.

The simple substance or compound loaded on the carbon powder desirably has an average primary particle diameter of 0.1 to 1,000 nm. This average primary particle diameter is an average primary particle diameter obtained by observation using a transmission electron microscope. The primary particle diameters of the loaded material differ depending upon the firing conditions used, such as firing temperature, firing atmosphere and the like. For example, a loaded material having an average primary particle diameter of the above range is obtained at a firing temperature of about 300° C. when the firing atmosphere is air, about 350° C. when the atmosphere is nitrogen, and about 370° C. when the atmosphere is hydrogen.

Thirdly, the lead-acid battery of the present invention is characterized in that the following active carbon and/or carbon black is added into the anode. That is, there is added, into the anode, an active carbon and/or carbon black containing at least one simple substance selected from Cu, Ni, Zn, Mn, Al, Si, K and Mg, or at least one compound thereof. The carbon material for use in a lead-acid battery according to the present invention is characterized by being an active carbon and/or carbon black containing at least one simple substance selected from Cu, Ni, Zn, Mn, Al, Si, K and Mg, or at least one compound thereof. Active carbon or carbon black has a complicated pore structure. The pores contain various impurities. By using, in particular, an active carbon or carbon black containing, as impurities, at least one simple substance selected from Cu, Ni, Zn, Mn, Al, Si, K and Mg, or at least one compound thereof, a lead-acid battery of improved high-efficiency charging characteristic can be obtained.

The active carbon is desirably an active carbon produced from coconut husk, having a Cu content of more than 5 ppm by weight but less than 15,000 ppm by weight. Since coconut husk which is a natural product, contains Cu, Mn, Al, Si and K, the active carbon produced therefrom contains the above elements in a large amount. When the active carbon contains, in particular, Cu in an amount of more than 5 ppm by weight but less than 15,000 ppm by weight, the anode of the resulting lead-acid battery can be improved significantly in high-efficiency charging characteristic as well as in charge acceptability.

The carbon black is desirably a furnace black having a total content of Ni, Cu, Zn and Mn more than 1 ppm by weight but less than 1,000 ppm by weight. Since fuel oil contains impurities such as Ni, Cu, Zn and Mn in a large amount, the furnace black produced therefrom also contains the above elements in a large amount. When the furnace black contains, in particular, Ni and Cu in a total amount of more than 1 ppm by weight but less than 1,000 ppm by weight, the anode of the resulting lead-acid battery can be improved significantly in high-efficiency charging characteristic as well as in charge acceptability.

Lastly, the carbon material for use in a lead-acid battery according to the present invention is characterized by being a carbon powder containing or loading thereon at least one simple substance selected from Hf, Nb, Ta, W, Ag, Zn, Ni, Co, Mo, Cu, V, Mn, Ba, K, Cs, Rb, Sr and Na, or at least one oxide, sulfate, hydroxide or carbide thereof. The carbon powder may be added into the electrolytic solution of a lead-acid battery or onto the surface of an electrode, whereby the start of charging can be accelerated. The loading of the simple substance or the oxide, sulfate, hydroxide or carbide thereof can be conducted desirably by wet loading.

Other objects, features and advantages of the invention will become apparent from the following description of the embodiments of the invention taken in conjunction with the accompanying drawings.

Figure 1:
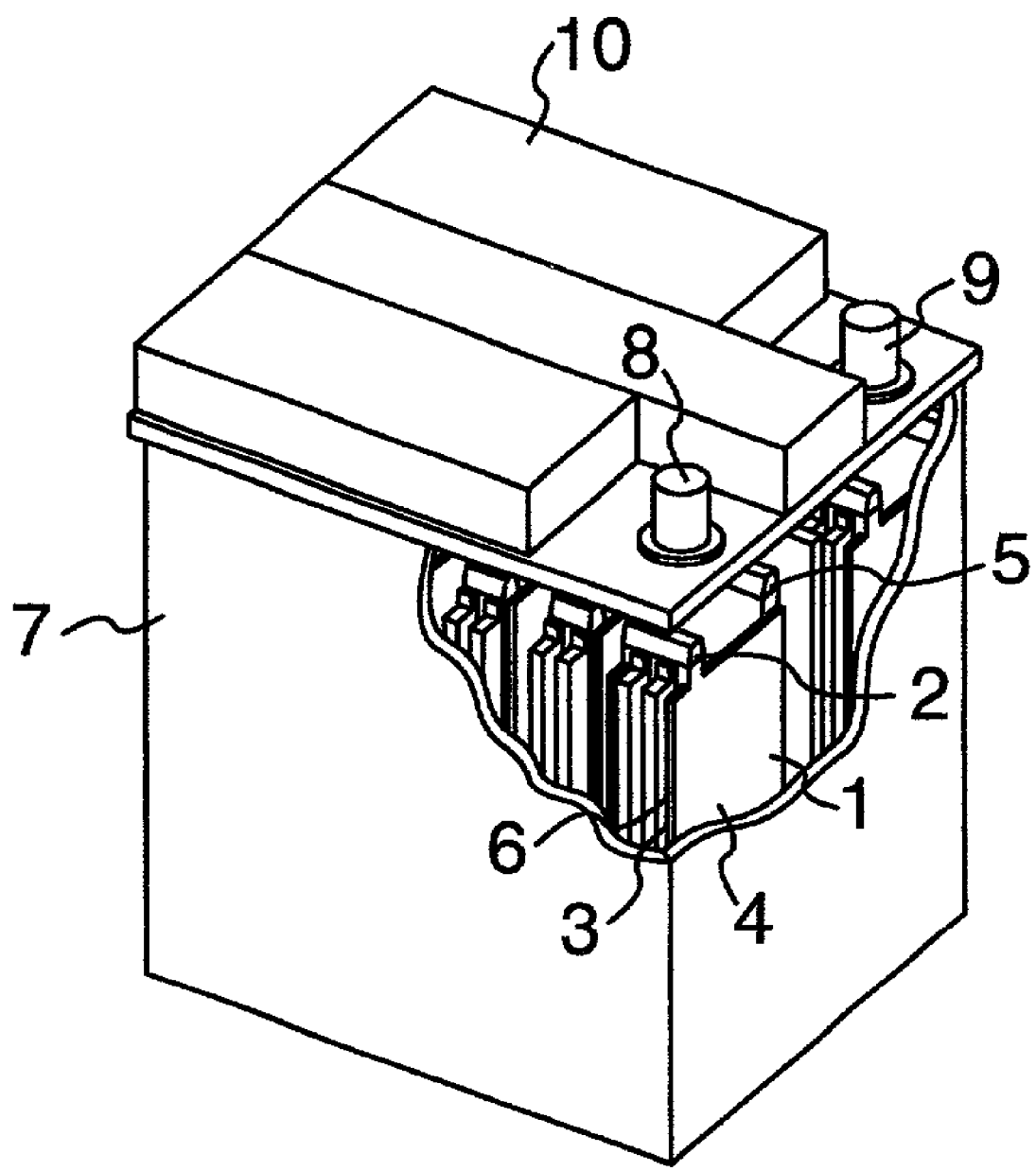
FIG. 1 is a drawing showing an embodiment of the present invention.

The numerals in FIG. 1 refer to the followings.

1: anode plate; 2: cathode plate; 3: separator; 4: group of electrodes; 5: cathode strap; 6: anode strap; 7: battery case; 8: cathode terminal; 9: anode terminal; 10: cover

DETAILED DESCRIPTION OF THE INVENTION

According to the present invention, a lead-acid battery can be provided which shows a small energy loss caused by gas generation even during large-current (2 C or more) charging and which has an improved high-efficiency charging characteristic. Here, 2 C is a current value necessary to discharge the total discharge capacity of a battery in 0.5 hour, and 1 C is a current value necessary to discharge the total discharge capacity of a battery in 1 hour.

The present invention is characterized by utilizing an action toward sulfur (S) commonly possessed by catalysts, for example, strong adsorbability for sulfur (S) possessed by the component contained in a catalyst. In desulfurization of, for example, crude oil, desulfurization of thiophenes has been generally well known. In desulfurization of benzothiophene, the S in benzothiophene is adsorbed on the active sites of the catalyst used and hydrogenated to become $H_2S$, which is eliminated as such; in this way, a desulfurization reaction proceeds. This applies also to the elementary reaction of charging in the anode of a lead-acid battery, that is, a reaction in which lead sulfate is dissociated into sulfate ion and lead ion. That is, the sulfate group in lead sulfate is adsorbed on the active sites of the catalyst and hydrogenated to become $HS_4^-$, which is released into the electrolytic solution as such. In the case of a lead-acid battery, since the sulfuric acid concentration in the electrolytic solution is as high as 30% by volume, dissociation in the form of $SO_4^{2-}$ is impossible and the most part of $SO_4^{2-}$ is dissociated in the form of $HSO_4^-$. Thus, diffusion in the form of $HS_4^-$ is important in order to increase the solubility of lead sulfate.

Meanwhile, in catalysts used for sulfuric acid production, there are mainly used components capable of taking $SO_X$ into the respective molecules and converting it into a sulfate of higher degree. $V_2O_5$ and sulfates of Rb, K, Cs, etc. are known to take $SO_X$ into the respective molecules and convert it into $VOSO_4$ or $Me_2S_2O_7$ (Me is Rb, K or Cs). This applies also to the elementary reaction of charging in the anode of a lead-acid battery, that is, a reaction in which lead sulfate is dissociated into sulfate ion and lead ion. The above oxide or each sulfate takes dissociated sulfate ion into the molecule and thereby can promote dissolution.

The anode of the present invention is characterized in that there is added, into the anode, a carbon containing a simple substance or a compound, both having a particular catalysis, for example, a catalysis for desulfurization, a catalysis for $SO_X$ oxidation or a catalysis for sulfuric acid production. Carbon is an essential substance for increasing the conductivity of lead sulfate, but no sufficient charging characteristic is obtained with carbon alone. Therefore, addition of a simple substance or a compound, both having a particular catalysis becomes necessary. Meanwhile, with addition of only a simple substance or a compound, both having a particular catalysis, no conductivity such as obtained with carbon and accordingly no satisfactory high-efficiency charging characteristic is obtainable.

In order to obtain a sufficient catalysis, it is desired to highly disperse, on a carbon, a simple substance or a compound, both having a particular catalysis, in the form of particles of very small diameters.

Some of active carbons or carbon blacks having complicated pore structures, for example, porous structure, fine structure, mesopore structure, micropore structure, submicropore structure, macropore structure, structure having inner surface and structure of high specific surface area, contain, in the pores, a small amount of a simple substance or a compound, both having the above-mentioned catalysis. This is advantageous for effective utilization of catalysis. Some of active carbons or carbon blacks have a function of adsorbing various molecules and ions into the complicated pores. Thus, in the elementary reaction of charging in the anode of a lead-acid battery, that is, a reaction in which lead sulfate is dissociated into sulfate ion and lead ion, sulfate ion is easily adsorbed into the pores of the active carbon. Since there is present, in the pores, a simple substance or a compound, both having the above-mentioned catalysis, sulfate ion is easily converted into $HSO_4^-$ or is taken into an oxide or sulfate, whereby charging reaction proceeds smoothly. Carbons produced from natural products or fuel oil, such as active carbon or carbon black and the like, often contain in themselves a large amount of a simple substance or a compound, both having a catalysis; therefore, by using a carbon obtained by subjecting a natural product-derived carbon to an acid treatment, a heat treatment or the like to control the concentration of the simple substance or compound at an optimum range, a superior high-efficiency charging characteristic can be obtained even with no loading on the carbon.

Further, containing a particular simple substance or compound, both having the above-mentioned catalysis highlky, the carbon powder of the present invention, when added into the electrolytic solution or onto the electrode surface, of a lead-acid battery, can accelerate the start of charging. The carbon can be adsorbed on the reaction interface of the active material of the lead-acid battery; thereby, the passivation of lead sulfate which is called sulfation can be suppressed, no passivation proceeds even when complete discharge has been made, and charge acceptability is improved remarkably.

Thus, by using the anode of the present invention, a lead-acid battery can be obtained which is applicable as an industrial battery requiring a high input characteristic and a high output characteristic, used for electric car, parallel hybrid electric car, simple hybrid car, power storage system, elevator, electric tools, uninterruptible power source, distributed power source, etc.

DESCRIPTION OF PREFERRED EMBODIMENTS

The present invention is described in more detail below by way of Examples. However, the present invention is in no way restricted to these Examples within the scope of the present invention. In-depth description is made on the Examples of the present invention, in comparison with Comparative Examples concerning lead-acid batteries produced for confirming the effects of the Examples.

Description is made first on methods for production of lead-acid batteries of Examples and Comparative Examples. With respect to production methods in Example 2, later Examples and Comparative Examples, the same procedures as in Example 1 are not described and different procedure portions are described.

EXAMPLE 1

Production of Simple Substance- and/or Compound-Loaded Carbons

In production of simple substance- and/or compound-loaded carbons, first, aqueous nickel nitrate solutions of different concentrations were prepared. Thereto were added 10 g of acetylene black as a carbon powder and 0.1 g of a surfactant. Each resulting mixture was stirred in a water bath of 40° C. Thereto was dropwise added sodium hydroxide until the pH of each mixture became 7. Then, filtration was made. The separated precipitate was washed with distilled water, dried at 120° C. for 2 hours, and fired in the air, nitrogen or hydrogen at 300 to 500° C. for 30 minutes to produce various nickel-loaded carbons. XRD (X-ray diffractometry) indicated that NiO was formed by the firing in the air, Ni was formed by the firing in hydrogen, and a mixture of NiO and Ni was formed by the firing in nitrogen. Incidentally, X-ray diffractometry is a method which measures the intensity of diffraction line while changing the angle of diffraction of X-ray and analyses the angle and the intensity, and is used for analysis of crystal structure. In the X-ray diffraction of the present invention, an ordinary powder diffraction method was used and a $CuK_\alpha$ ray was used as the X-ray source.

In Table 1 are shown the Ni contents in various Ni-loaded carbons, as determined by ICP (inductively coupled plasma) spectrometry. Incidentally, ICP spectrometry is a method which can detect a plurality of elements and determine the quantity simultaneously at a high sensitivity. A sample was placed in an acidic solution of 100° C. or more (e.g. boiling hydrochloric acid or nitric acid solution); boiling was conducted for 2 to 3 hours to dissolve the metal in the sample; and determination was made for the resulting solution.

TABLE 1

| Symbol | Firing atmosphere | Firing temperature | Ni content (ppm) |
|---|---|---|---|
| 1-a | Air | 300° C. | 10000 |
| 1-b | " | 300° C. | 5000 |
| 1-c | " | 300° C. | 1000 |
| 1-d | " | 300° C. | 500 |
| 1-e | " | 300° C. | 100 |
| 1-f | " | 300° C. | 50 |

TABLE 1-continued

| Symbol | Firing atmosphere | Firing temperature | Ni content (ppm) |
| --- | --- | --- | --- |
| 1-g | " | 300° C. | 10 |
| 1-h | " | 300° C. | 1 |
| 1-i | Nitrogen | 300° C. | 100 |
| 1-j | " | 350° C. | 100 |
| 1-k | " | 400° C. | 100 |
| 1-l | " | 450° C. | 100 |
| 1-m | Hydrogen | 400° C. | 100 |
| 1-n | " | 450° C. | 100 |
| 1-o | " | 500° C. | 100 |

Production of Anode Plates

In production of anode plates, first, there were added, to a lead powder, 0.3% by weight of lignin, 0.2% by weight of barium sulfate or strontium sulfate, and 0.2 to 1.0% by weight of one of the above-mentioned simple substance- and/or compound-loaded carbon powders of the present invention, followed by kneading using a kneader for about 10 minutes, to prepare various mixtures. Then, each of the resulting lead powder mixtures was kneaded with 13% by weight, based on the lead powder, of diluted sulfuric acid (specific gravity: 1.26, 20° C.) and 12% by weight, also based on the lead powder, of water to prepare various anode active material pastes. 73 g of each anode active material paste was filled in a collector which was a lattice-shaped material made of a lead-calcium alloy. The paste-filled collector was allowed to stand for 18 hours at 50° C. at a humidity of 95% for aging and then allowed to stand for 2 hours at 110° C. for drying, to produce various anode plates before formation.

Production of Cathode Plate

In production of a cathode plate, first, a lead powder was kneaded with 13% by weight, based on the lead powder, of diluted sulfuric acid (specific gravity: 1.26, 20° C.) and 12% by weight, also based on the lead powder, of water to prepare a cathode active material paste. Then, 85 g of the cathode active material paste was filled in a collector which was a lattice-shaped material made of a lead-calcium alloy. The paste-filled collector was allowed to stand for 18 hours at 50° C. at a humidity of 95% for aging and then allowed to stand for 2 hours at 110° C. for drying, to produce a cathode plate before formation.

Production of Batteries and Formation thereof

FIG. 1 is a drawing showing an embodiment of the present invention. Six anode plates before formation 1 and five cathode plates before formation 2 were laminated via separators 3 made of a glass fiber; the plates of same polarity were connected with each other using straps to form a group of electrodes 4. 5 is a cathode strap and 6 is an anode strap. Eighteen groups of electrodes 4 were connected in series in a battery case 7, after which an electrolytic solution of diluted sulfuric acid having a specific gravity of 1.05 at 20° C. was poured into the case to form various batteries before formation. Each battery before formation was subjected to formation at 9 A for 42 hours; then, the electrolytic solution was discharged; and a different electrolytic solution of diluted sulfuric acid having a specific gravity of 1.28 at 20° C. was poured. A cathode terminal 8 and an anode terminal 9 were welded; a cover 10 having an exhaust valve was fitted for sealing; thereby, various lead-acid batteries were completed. Each battery had a capacity of 18 Ah and the average discharge voltage was 36 V.

A battery having a discharge voltage of 36 V and a charging voltage of 42 V is called a 42 V battery. In the present invention, however, the voltage range is not restricted thereto. An intended voltage can be achieved by connecting a plurality of single batteries in series. In the Examples of the present invention, 42 V batteries were produced and the characteristics of the present invention are not varied in this voltage range.

A high-efficiency charging characteristic test was conducted as follows. First, each lead-acid battery obtained was subjected to constant-current constant-voltage charging for 16 hours at a charging current of 6 A and at an upper limit voltage of 44.1 V; then, discharged at a discharge current of 4 A until a discharge voltage of 31.5 V is reached, to confirm the discharge capacity of the battery. Constant-current constant-voltage charging was again conducted for 16 hours at a charging current of 6 A and at an upper limit voltage of 44.1 V; then, 10% of the above-confirmed discharge capacity was discharged at a discharge current of 4 A, to set the scale of charging (SOC) of the battery at 90%. There was measured a charging voltage Vc when charging was conducted for 30 seconds from the 90% SOC at a charging current of 40 A.

As the charging reaction proceeds, the charging voltage Vc increases and also hydrogen gas is generated from the anode by the electrolysis of water. The amount of the hydrogen gas generated increases with an increase in the charging voltage Vc and, finally, water is exhausted. Therefore, the charging voltage Vc inevitably has an upper limit, and it is necessary to control at a voltage lower than the upper limit. In the battery tested, the upper limit voltage at which the amount of the hydrogen gas generated reaches the allowable limit, is 45 V and the upper limit voltage at which no hydrogen gas generation takes place, is 43.2 V; therefore, evaluation of the battery was made using these values as a standard. That is, a battery of lower charging voltage is better.

Figure 2:
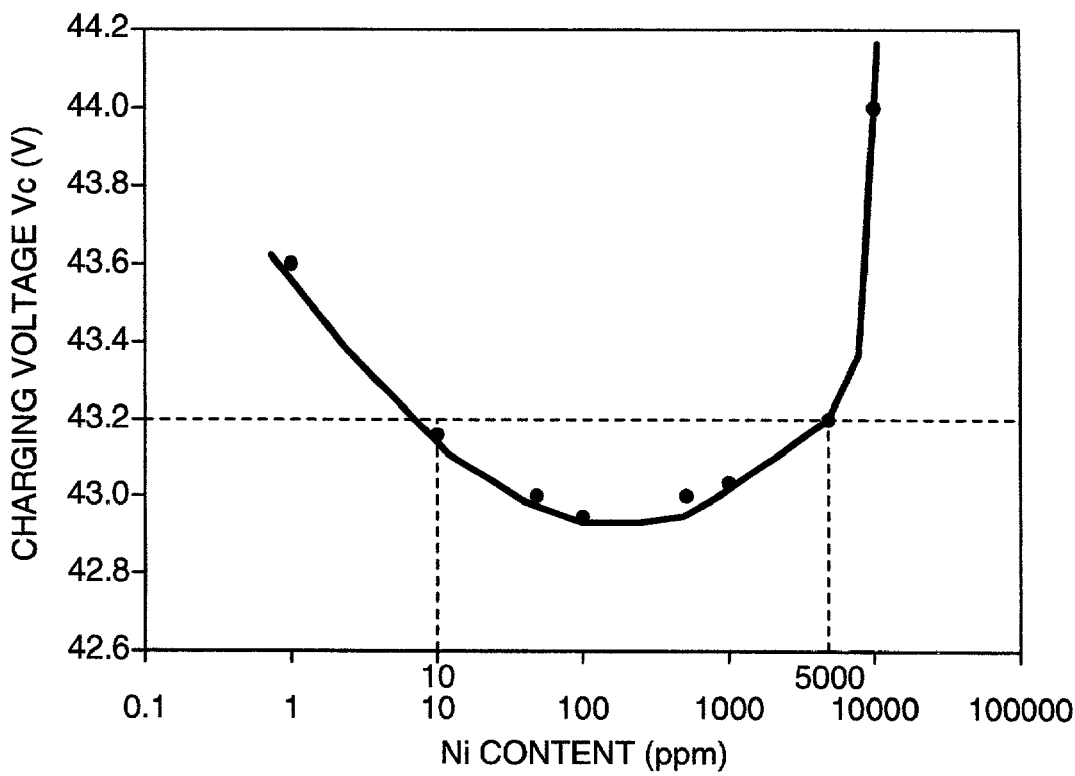
FIG. 2 is a graph showing the relation between Ni content (ppm) and charging voltage (Vc) in the case of using the nickel-loaded acetylene black obtained by firing in air, in Example 1 of the present invention.

In FIG. 2 is shown a relation between the Ni content (ppm) in the nickel-loaded acetylene black fired in the air and charging voltage Vc. In any Ni content, the charging voltage Vc was lower than 45 V, i.e. the upper limit voltage at which the amount of the hydrogen gas generated reached the allowable limit, and a good high-efficiency charging characteristic was obtained. Particularly in a Ni content range of 10 to 5,000 ppm, the charging voltage Vc was lower than 43.2 V, and a very good high-efficiency charging characteristic was obtained. In a Ni content range of 50 to 1,000 ppm, the charging voltage Vc was 43 V or lower, and a further superior high-efficiency charging characteristic was obtained.

Figure 3:
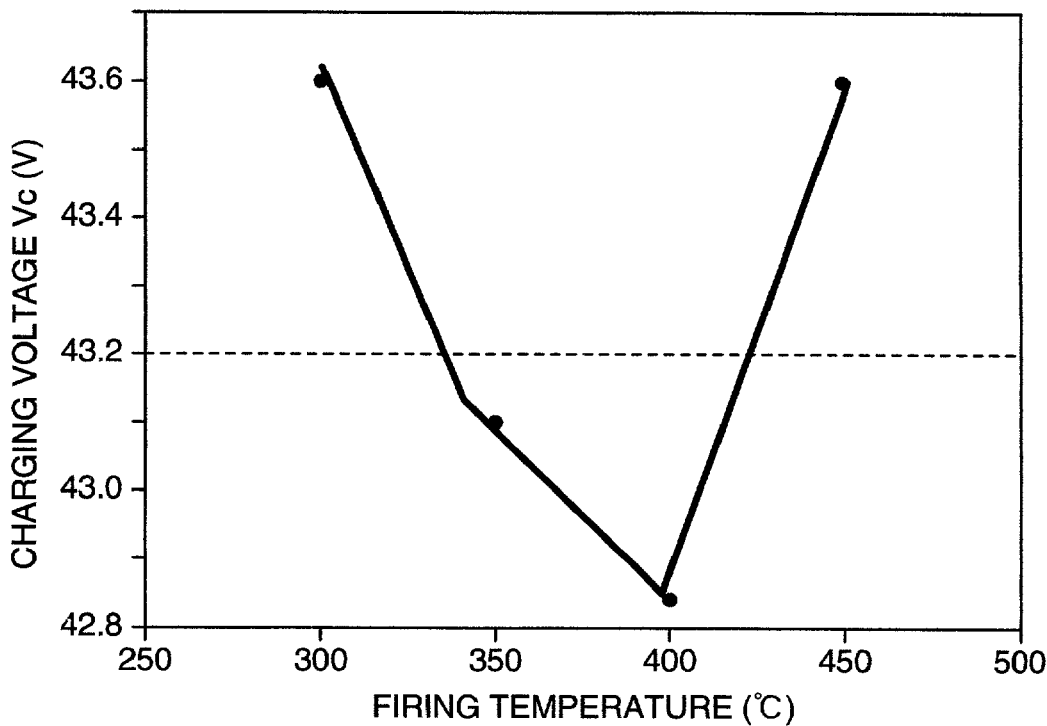
FIG. 3 is a graph showing the relation between firing temperature and charging voltage (Vc) in the case of using the nickel-loaded acetylene black obtained by firing in nitrogen, in Example 1 of the present invention.

In FIG. 3 is shown a relation between the firing temperature of the nickel-loaded acetylene black fired in nitrogen and charging voltage Vc. In any temperature, the charging voltage Vc was lower than 45 V, and a good high-efficiency charging characteristic was obtained. Particularly when the firing temperature was 350 to 400° C., the charging voltage Vc was lower than 43.2 V, and a further superior high-efficiency charging characteristic was obtained. The NiO or metallic Ni in the loaded materials fired in a temperature range of 350 to 400° C. had an average primary particle diameter of 0.1 to 1,000 nm as measured by TEM.

Figure 4:
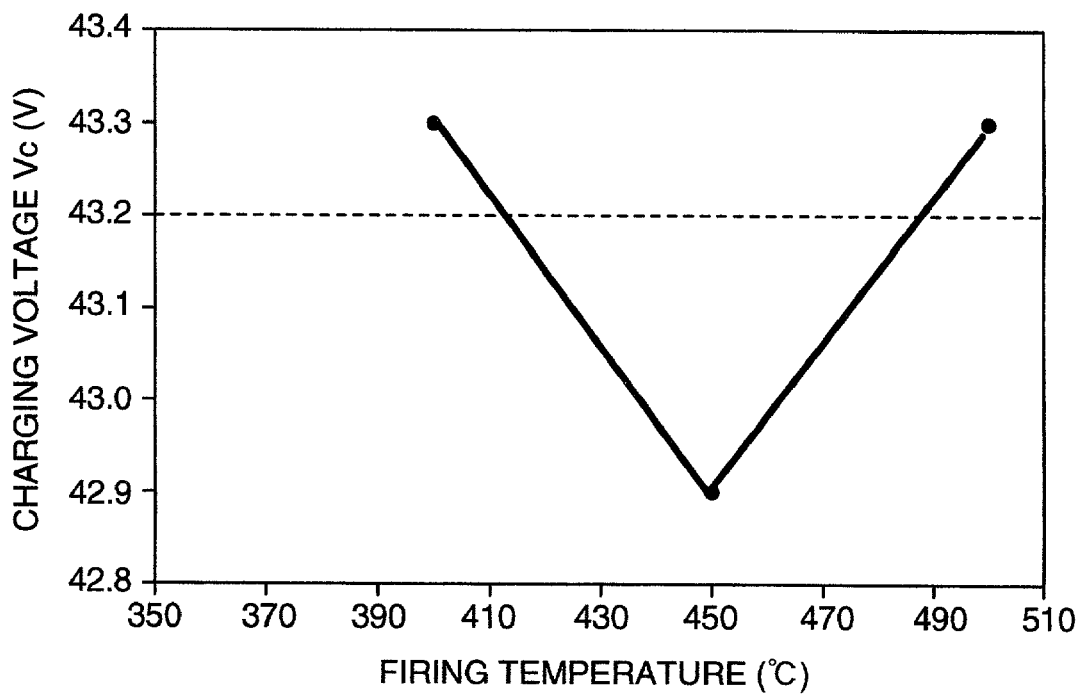
FIG. 4 is a graph showing the relation between firing temperature and charging voltage (Vc) in the case of using the nickel-loaded acetylene black obtained by firing in hydrogen, in Example 1 of the present invention.

In FIG. 4 is shown a relation between the firing temperature of the nickel-loaded acetylene black fired in hydrogen and charging voltage Vc. In any temperature, the charging voltage Vc was lower than 45 V, and a good high-efficiency charging characteristic was obtained. Particularly when the firing temperature was around 450° C., the charging voltage Vc was lower than 43.2 V, and a further superior high-efficiency charging characteristic was obtained. The Ni as the loaded material fired at around 450° C. had an average primary particle diameter of 0.1 to 1,000 nm as measured by TEM.

COMPARATIVE EXAMPLE 1

Using an acetylene black not loaded with any simple substance or any compound, a lead-acid battery was produced in the same manner as in Example 1, and its high-efficiency charging characteristic was evaluated. The Ni content in this acetylene was less than 1 ppm, that is, below the detection limit as measured by ICP spectrometry. The charging voltage Vc increased to 48 V, which was higher than the upper limit voltage 45 V, and the high-efficiency charging characteristic was inferior.

EXAMPLE 2

Using, as a carbon powder, various carbons shown in Table 2, nickel-loaded carbons were produced in the same manner as in Example 1.

Lead-acid batteries were produced in the same manner as in Example 1 and measured for high-efficiency charging characteristic. Their charging voltages Vc are shown in Table 2. With all the carbons, the charging voltages Vc were below 45 V and good high-efficiency charging characteristics were obtained. Also, with mixed carbon systems thereof, the charging voltages Vc were below 45 V and good high-efficiency charging characteristics were obtained.

TABLE 2

| Kind of carbon | Primary particle diameter (nm) | Specific surface area ($m^2/g$) | Amount of dibutyl phthalate absorbed ($cm^3$/100 g) | Apparent density ($g/dm^3$) | Charging voltage Vc(V) | Loaded Ni amount (ppm) |
|---|---|---|---|---|---|---|
| Carbon black | 30 | 1270 | 495 | 115 | 44.5 | 10000 |
| " | 11 | 362 | 270 | 109 | 44.8 | 15000 |
| " | 30 | 254 | 174 | 270 | 43 | 750 |
| " | 15 | 1475 | 330 | 152 | 43.1 | 1000 |
| " | 13 | 560 | 91 | 400 | 43.7 | 1500 |
| " | 20 | 140 | 117 | 310 | 44.3 | 5 |
| Natural graphite | | | | | 44 | 8000 |
| Artificial graphite | | | | | 44.5 | 25000 |
| Pyrolytic carbon | | | | | 44.1 | 12000 |
| Coke | | | | | 43.8 | 6000 |
| Isotropic graphite | | | | | 43.1 | 300 |
| Mesophase carbon | | | | | 43 | 950 |
| Pitch-based carbon fiber | | | | | 44.5 | 50000 |
| Carbon fiber by vapor phase growth | | | | | 43.3 | 7000 |
| Carbon fluoride | | | | | 43.1 | 4000 |
| Nano carbon | | | | | 43 | 800 |
| Active carbon | | | | | 43.1 | 750 |
| Active carbon fiber | | | | | 43 | 1000 |
| PAN-based carbon fiber | | | | | 44.2 | 20000 |
| Pitch-based carbon fiber | | | | | 44 | 10000 |

COMPARATIVE EXAMPLE 2

Various carbons not loading any simple substance or compound, shown in Table 3 were measured for Ni content by ICP spectrometry. The Ni contents in all the carbons were less than 1 ppm and below the detection limit. Using these carbons, lead-acid batteries were produced in the same manner as in Example 1, and their high-efficiency charging characteristics were evaluated. Their charging voltages Vc were higher than 45 V and their high-efficiency charging characteristics were inferior.

TABLE 3

| Kind of carbon | Primary particle diameter (nm) | Specific surface area ($m^2/g$) | Amount of dibutyl phthalate absorbed ($cm^3$/100 g) | Apparent density ($g/dm^3$) | Charging voltage Vc(V) | Loaded Ni amount (ppm) |
|---|---|---|---|---|---|---|
| Carbon black | 30 | 1270 | 495 | 115 | 46.7 | 0 |
| " | 11 | 362 | 270 | 109 | 46 | 0 |
| " | 30 | 254 | 174 | 270 | 48.5 | 0 |
| " | 15 | 1475 | 330 | 152 | 49 | 0 |
| " | 13 | 560 | 91 | 400 | 48.8 | 0 |
| " | 20 | 140 | 117 | 310 | 47 | 0 |

TABLE 3-continued

| Kind of carbon | Primary particle diameter (nm) | Specific surface area (m²/g) | Amount of dibutyl phthalate absorbed (cm³/100 g) | Apparent density (g/dm³) | Charging voltage Vc(V) | Loaded Ni amout (ppm) |
|---|---|---|---|---|---|---|
| Natural graphite | | | | | 46.2 | 0 |
| Artificial graphite | | | | | 48.4 | 0 |
| Pyrolytic carbon | | | | | 49.5 | 0 |
| Coke | | | | | 49.1 | 0 |
| Isotropic graphite | | | | | 48 | 0 |
| Mesophase carbon | | | | | 46.8 | 0 |
| Pitch-based carbon fiber | | | | | 48.3 | 0 |
| Carbon fiber by vapor phase growth | | | | | 48.1 | 0 |
| Carbon fluoride | | | | | 47 | 0 |
| Nano carbon | | | | | 46.7 | 0 |
| Active carbon | | | | | 48 | 0 |
| Active carbon fiber | | | | | 48.5 | 0 |
| PAN-based carbon fiber | | | | | 46.5 | 0 |
| Pitch-based carbon fiber | | | | | 49.6 | 0 |

EXAMPLE 3

Various active carbons were used as a carbon. The contents of Cu, Ni, Mn, Al, Si, K and Mg in the active carbons were measured by ICP spectrometry and are shown in Table 4. Using these active carbons containing various amounts of impurities, lead-acid batteries were produced in the same manner as in Example 1, and their high-efficiency charging characteristics were evaluated. Their charging voltages Vc are shown in Table 4. All the charging voltages Vc were lower than 45 V and their high-efficiency charging characteristics were good.

TABLE 4

| Symbol | Cu (ppm) | Ni (ppm) | Mn (ppm) | Al (ppm) | Si (ppm) | K (ppm) | Mg (ppm) | Charging voltage Vc (V) |
|---|---|---|---|---|---|---|---|---|
| 4-a | 5 | 50 | 10 | <1 | <1 | 90 | <1 | 43.1 |
| 4-b | <1 | 2200 | <1 | 10 | <1 | 4800 | <1 | 43.1 |
| 4-c | 500 | 1050 | 850 | <1 | 1400 | <1 | <1 | 43 |
| 4-d | 55 | 75 | 75 | <1 | <1 | 105 | 250 | 43 |
| 4-e | <1 | <1 | <1 | 360 | <1 | <1 | <1 | 44.8 |
| 4-f | <1 | <1 | <1 | <1 | <1 | <1 | 150 | 44.1 |

EXAMPLE 4

Active carbons produced from a coconut husk were used as a carbon. A coconut husk as a raw material for active carbons was washed with 1 N (mole/liter) hydrochloric acid for time lengths shown in Table 5, then washed with water until the pH of the washings became 7 and dried, and thereafter fired to produce active carbons. The Cu contents in these active carbons as measured by ICP spectrometry are shown in Table 5. Using these active carbons produced from a coconut husk, containing various levels of Cu, lead-acid batteries were produced in the same manner as in Example 1, and their high-efficiency charging characteristics were evaluated. Their charging voltages Vc are shown in Table 5. In all the Cu contents, the charging voltages Vc were lower than 45 V and good high-efficiency charging characteristics were obtained. In a Cu content range of more than 5 ppm and less than 15,000 ppm, the charging voltage Vc was lower than 43.2 V, and the high-efficiency charging characteristic was further better.

TABLE 5

| Symbol | Time of washing in the hydrochloric acid | Cu (ppm) | Ni (ppm) | Mn (ppm) | Al (ppm) | Si (ppm) | K (ppm) | Mg (ppm) | Charging voltage Vc (V) |
|---|---|---|---|---|---|---|---|---|---|
| 5-a | 1 minute | 15000 | 5600 | 5600 | 120000 | 11000 | 25000 | 49000 | 43.5 |
| 5-b | 10 minutes | 4800 | 1500 | 1500 | 85000 | 3300 | 3900 | 3700 | 43.1 |
| 5-c | 30 minutes | 1200 | 680 | 680 | 19000 | 1700 | 1400 | 2200 | 43 |
| 5-d | 45 minutes | 510 | 75 | 75 | 4200 | 570 | 410 | 250 | 43 |
| 5-e | 1 hour | 19 | <1 | <1 | 360 | 82 | <1 | <1 | 43 |
| 5-f | 3 hours | 5 | <1 | <1 | 50 | 11 | <1 | <1 | 44.2 |

EXAMPLE 5

Figure 5:
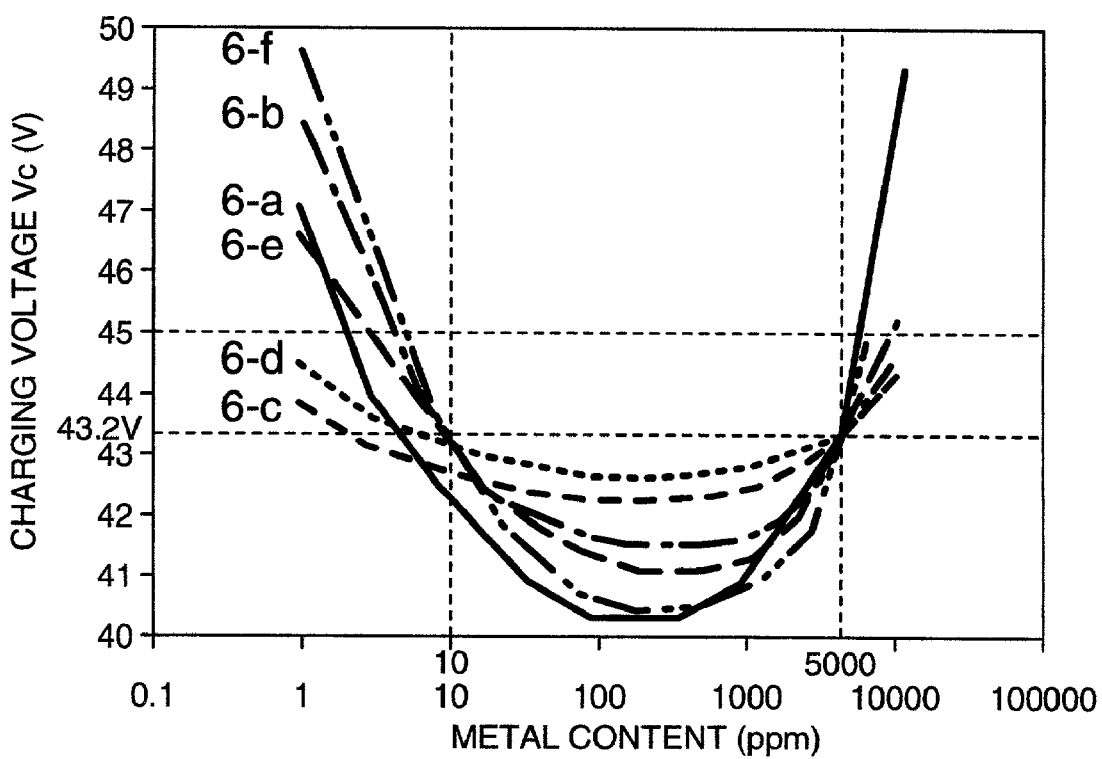
FIG. 5 is graphs showing the relations between the loaded amount of loaded elements and charging voltage (Vc), obtained in Example 5 of the present invention.

On the various kinds of carbon blacks shown in Table 3 were loaded the various kinds of simple substances and/or compounds shown in Table 6. The loaded forms of the simple substances and compounds were confirmed by X-ray diffractometry to be a simple substance, an oxide, a sulfate, a hydroxide, a carbide, or a mixture thereof, as shown in Table 6. Then, lead-acid batteries were produced in the same manner as in Example 1, and their high-efficiency charging characteristics were evaluated. In FIG. 5 are shown relations between the content of each loaded element and the charging voltage Vc obtained. All the charging voltages Vc show good high-efficiency charging characteristics. In a loaded element content range of 10 to 5,000 ppm, the charging voltage Vc was lower than 43.2 V and a strikingly good high-efficiency charging characteristic was obtained. In a loaded element content range of 50 to 1,000 ppm, the charging voltage Vc was 43 V or lower and a further superior high-efficiency charging characteristic was obtained. Also in systems using a plurality of the above simple substances and/or compounds, the charging voltages Vc were lower than 45 V and good high-efficiency charging characteristics were obtained.

TABLE 6

| Symbol | Kind of loaded element | Loaded form |
|---|---|---|
| 6-a | Mo | MoC |
| 6-b | Co | Co + CoO |
| 6-c | Ba | $BaSO_4$ |
| 6-d | Mn | $MnSO_4$ + $Mn(OH)_2$ + MnOOH |
| 6-e | Sr | $SrSO_4$ |
| 6-f | Cu | Cu |

EXAMPLE 6

On the various kinds of carbon blacks shown in Table 3 were loaded the various kinds of simple substances and/or compounds shown in Table 7. The loaded forms of the simple substances and compounds were confirmed by X-ray diffractometry to be a simple substance, an oxide, a sulfate, a hydroxide, a carbide, or a mixture thereof, as shown in Table 7. Then, lead-acid batteries were produced in the same manner as in Example 1, and their high-efficiency charging characteristics were evaluated. In Table 7 are shown the charging voltages Vc obtained. All the charging voltages Vc were lower than 45 V and good high-efficiency charging characteristics were obtained. Also in systems using a plurality of the above simple substances and/or compounds, the charging voltages Vc were lower than 45 V and good high-efficiency charging characteristics were obtained.

TABLE 7

| Symbol | Kind of loaded element | Loaded form | Charging voltage Vc(V) |
|---|---|---|---|
| 7-a | Hf | HfC | 44.3 |
| 7-b | Nb | NbC | 43.5 |
| 7-c | Ta | Ta | 43.8 |
| 7-d | W | WC | 44.1 |
| 7-e | Ag | Ag | 43.2 |
| 7-f | Zn | $ZnSO_4$ | 43.8 |
| 7-g | V | $V_2O_5$ | 44.6 |
| 7-h | Cs | $Cs_2SO_4$ | 44.5 |
| 7-i | Rb | $Rb_2SO_4$ | 43.2 |
| 7-j | K + Na | $K_2SO_4$ + $NaSO_4$ | 43.1 |
| 7-k | Co + Mo | $Co(OH)_2$ + $MoO_3$ | 43 |

EXAMPLE 7

1% by weight, based on an acetylene black, of one of the catalysts shown in Table 8 was added to the acetylene black, followed by thorough mixing in a mortar, to prepare various carbon blacks each containing a simple substance and/or a compound(s) having a catalysis for desulfurization or $SO_X$ oxidation. Various lead-acid batteries were produced in the same manner as in Example 1 and evaluated for high-efficiency charging characteristic. All of the batteries showed charging voltages lower than 45 V and had good high-efficiency charging characteristics. Particularly when there were used catalysts for petroleum refining, fuel oil desulfurization, gas production, desulfurization or deodorization for pollution control, or sulfuric acid production, the charging voltages Vc were lower than 43.2 V and strikingly good high-efficiency charging characteristics were obtained. When there were used simple substances such as Co, Mo, Ni, Zn, Cu and Mn, or their compounds in catalysts for petroleum refining, fuel oil desulfurization, gas production, or desulfurization or deodorization for pollution control, or when there were used simple substances such as alkali metals, alkaline earth metals, V, Mn and rare earth elements, or their compounds in catalysts for sulfuric acid production, the charging voltages Vc were 43 V or lower and further better high-efficiency charging characteristics were obtained. Also, in systems using a plurality of the above simple substances and/or compounds in admixtures, good high-efficiency charging characteristics were obtained. Also in systems using, as a carbon powder, any one of the carbons shown in Table 3, good high-efficiency charging characteristics were obtained.

TABLE 8

| Catalysis | Kind of catalyst | Main components(s) | Charging voltage Vc (V) |
|---|---|---|---|
| Desulfurization | — | Ru | 44 |
| Desulfurization | Catalyst for desulfurization in petroleum refining | CoO, $MoO_3/Al_2O_3$ (carrier) | 42.7 |
| Desulfurization | Catalyst for desulfurization in petroleum refining | NiO, CoO, $MoO_3/Al_2O_3$ (carrier) | 42.9 |
| Desulfurization | Catalyst for direct desulfurization of fuel oil | NiO, $MoO_3/Al_2O_3$ (carrier) | 43 |
| Desulfurization | Catalyst for indirect desulfurization of fuel oil | NiO, $TiO_2$, $MoO_3/Al_2O_3$ (carrier) | 43 |

TABLE 8-continued

| Catalysis | Kind of catalyst | Main components(s) | Charging voltage Vc (V) |
|---|---|---|---|
| Desulfurization | Catalyst for desulfurization in gas production | C | 43.2 |
| Desulfurization | Catalyst for desulfurization in gas production | ZnO | 42.6 |
| Desulfurization | Catalyst for desulfurization in gas production | CuO/active carbon (carrier) | 42.8 |
| Desulfurization | Catalyst for desulfurization in gas production | Fe | 43.2 |
| Desulfurization | Catalyst for deodorization in pollution control | CoO, $MnO_2$ | 42.8 |
| Desulfurization | Catalyst for deodorization in pollution control | $Co(OH)_2$, $MnSO_4$ | 42.9 |
| Desulfurization | Catalyst for deodorization in pollution control | $Al_2O_3$ | 43.2 |
| Desulfurization | Catalyst for desulfurization in petroleum refining | NiO, CoO, $MoO_3/Al_2O_3$ (carrier) | 43 |
| $SO_x$ oxidation | Catalyst for sulfuric acid production | $V_2O_5$, $K_2SO_4$, $SiO_2$ | 42.9 |
| $SO_x$ oxidation | Catalyst for sulfuric acid production | $V_2O_5$ | 43 |
| $SO_x$ oxidation | Catalyst for sulfuric acid production | $Cs_2SO_4$, $Rb_2SO_4$, $CeO_2$ | 43 |
| $SO_x$ oxidation | Catalyst for sulfuric acid production | $BaSO_4$, $MnSO_4$, $La_2O_3$ | 43 |
| $SO_x$ oxidation | — | $MgSO_4$, Pt | 43.3 |
| $SO_x$ oxidation | — | $Al_2(SO_4)_3$ | 44.5 |

Figure 6:
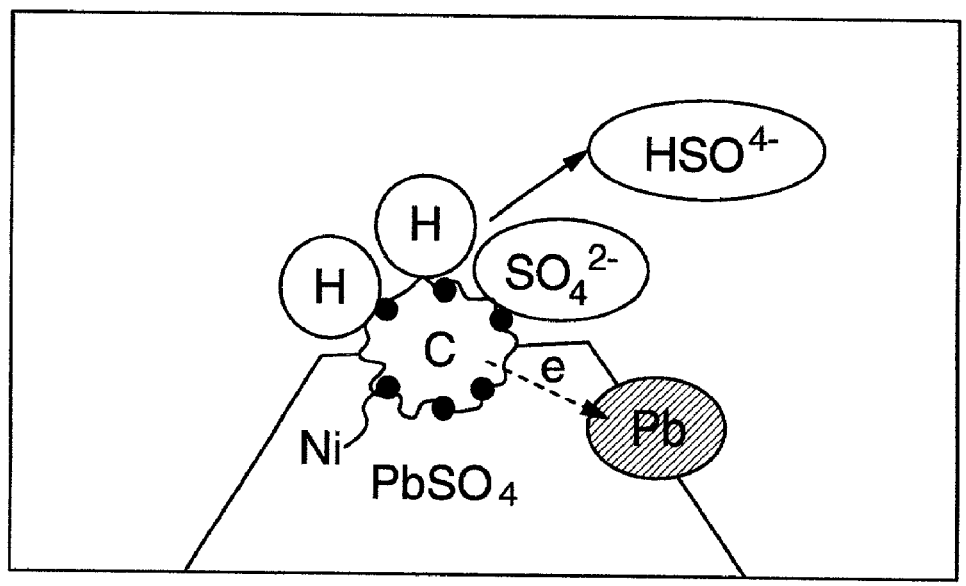
FIG. 6 is a drawing showing a model of the catalysis for desulfurization in Example 7 of the present invention.

With elements of low hydrogen overvoltage, such as Ni, Co, Mo, Cu and the like, hydrogen generation takes place simultaneously with the charging reaction. FIG. 6 shows a model of the reaction mechanism. Water molecules in an electrolytic solution are dissociated on the above-mentioned element and the generated hydrogen ion is once adsorbed thereon. The sulfate ion generated by the dissolution of lead sulfate is also adsorbed thereon, and is bonded with the hydrogen ion to become $HSO_4^-$, which is released into the electrolytic solution. Meanwhile, the lead ion generated also by the dissolution of lead sulfate accepts electrons from carbon and deposits as metallic lead. In this way, the charging reaction proceeds easily and resultantly the lead-acid battery shows a good high-efficiency charging characteristic. Therefore, even with simple substances or their compounds, other than those shown above, having a catalysis for desulfurization, a reaction proceeds in the same mechanism as above, and the lead-acid battery shows a good high-efficiency charging characteristic.

Figure 7:
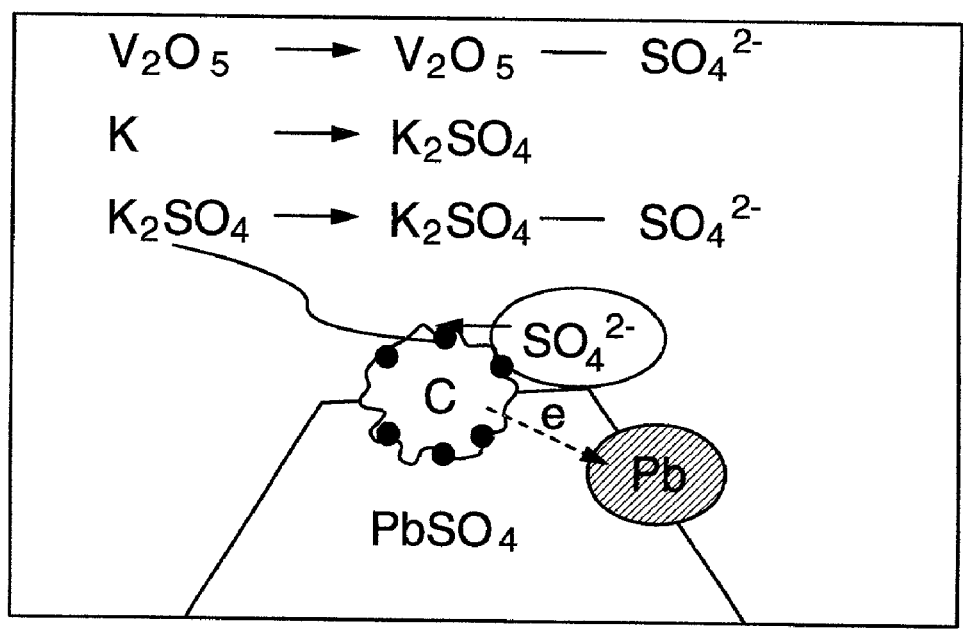
FIG. 7 is a drawing showing a model of the catalysis for $SO_X$ oxidation in Example 7 of the present invention.

With simple substances or their compounds, which are easily converted into the respective sulfates, such as V, Mn, alkali metals, alkaline earth metals, rare earth elements and the like, sulfation proceeds in the battery. FIG. 7 shows a model of this reaction mechanism. The sulfate ion generated by the dissociation of lead sulfate is adsorbed on the above-mentioned element and is easily taken into the simple substance or compound of the element. Meanwhile, the lead ion generated also by the dissolution of lead sulfate accepts electrons from carbon and deposits as metallic lead. In this way, the charging reaction proceeds easily and resultantly the lead-acid battery shows a good high-efficiency charging characteristic. Therefore, even with simple substances or their compounds, other than those shown above, having a catalysis for $SO_X$ oxidation, a reaction proceeds in the same mechanism as above, and the lead-acid battery shows a good high-efficiency charging characteristic.

EXAMPLE 8

Evaluation of Single Electrodes

The simple substances, oxides, sulfates, hydroxide or carbides shown in Table 9 were added to or loaded on an acetylene black singly or in combination, in an amount of 4,000 to 5,000 ppm based on the acetylene black, to prepare various carbon powders. 0.5% by weight of each carbon powder was added to a lead powder, followed by pressure molding, to produce various acting electrodes. Using one of the acting electrodes, a platinum wire as an opposite electrode, a silver/silver chloride electrode as a reference electrode and, as an electrolytic solution, diluted sulfuric acid having a specific gravity of 1.26 at 20° C., a cyclic voltammogram was determined. The scanning speed was 50 mV/min and the scanning potential was −800 mV to −200 mV (based on the silver/silver chloride electrode). Before the test, a reduction treatment of 5 minutes was conducted at −1,400 mV (based on the silver/silver chloride electrode). With respect to the current-potential characteristic examined, the current density taken as the axis of ordinate was expressed as log |I| (an absolute value in log). The minimum value of log |I| indicates a potential at start of charging and a potential at start of discharge, and the potential at start of charging and the potential at start of discharge were expressed by Ec and Ed, respectively.

Figure 8:
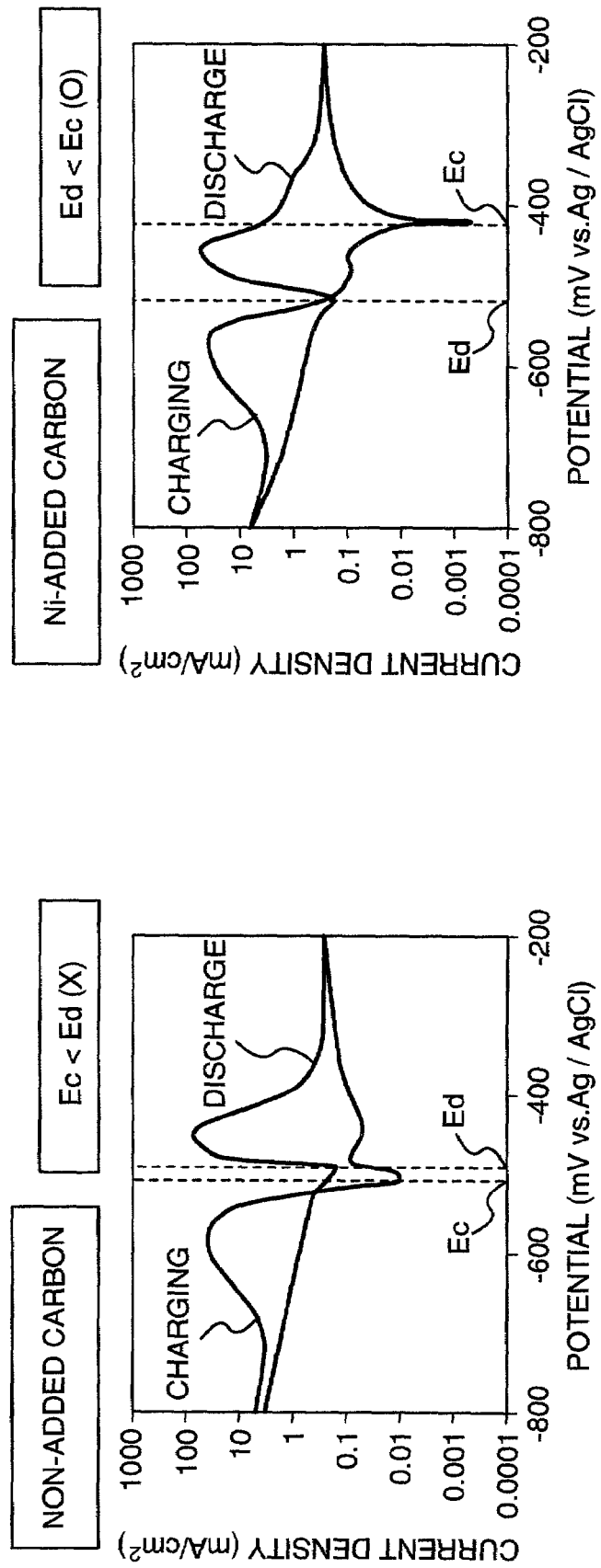
FIG. 8 is graphs each showing the current-potential characteristic obtained in Example 8 of the present invention.

FIG. 8 shows the current-potential characteristics of a Ni-added carbon-containing electrode and a non-added carbon-containing electrode. When the potential at start of charging is expressed by Ec and the potential at start of discharge is expressed by Ed, a relation of Ec>Ed results in the Ni-added carbon. This indicates that charging starts earlier, passivation of lead sulfate does not proceed even when complete discharge is conducted, and charging acceptability is strikingly improved. Meanwhile, in the case of the non-added carbon, a relation of Ec<Ed appears which is opposite to the case of the Ni-added carbon. This indicates that start of charging is slow, passivation proceeds when complete discharge is conducted, and charging acceptability is strikingly low.

In Table 9 are shown evaluation results on the relations of Ec and Ed determined for various carbons each containing a simple substance or a compound(s). Those carbons showing the relation of Ec>Ed are improved in charging acceptability and therefore are rated as ◯, and a carbon showing the relation of Ec<Ed is inferior in charging acceptability and therefore is rated as X. Superior in charging acceptability were simple substances or compounds, of Hf, Nb, Ta, W, Ag, Zn, Ni, Co, Mo, Cu, V, Mn, Ba, K, Cs, Rb, Sr and Na.

TABLE 9

| Kind of loaded element | Loaded form | Charging acceptability |
|---|---|---|
| Hf | HfC | ○ |
| Nb | NbC | ○ |
| Ta | Ta | ○ |
| W | WC | ○ |
| Ag | Ag | ○ |
| Zn | $ZnSO_4$ | ○ |
| V | $V_2O_5$ | ○ |
| Cs | $Cs_2SO_4$ | ○ |
| Rb | $Rb_2SO_4$ | ○ |
| K + Na | $K_2SO_4$ + $NaSO_4$ | ○ |
| Co + Mo | CoO + $MoO_3$ | ○ |
| Ni | $Ni(OH)_2$ | ○ |
| Cu | CuO | ○ |
| Mn | $MnSO_4$ | ○ |
| Ba + Sr | $BaSO_4$ + $SrSO_4$ | ○ |
| No loading | — | x |

EXAMPLE 9

In Table 10 are shown relations between the content of impurities (e.g. Cu) in carbon blacks and charging voltage showing high-efficiency charging characteristic of a lead-acid battery using the carbon blacks, obtained when various carbon blacks were used as a carbon. In Table 10 are shown the contents of copper, nickel, manganese, aluminum, silicon, potassium and zinc determined by ICP spectrometry. Using various carbon blacks different in impurity content in place of simple substance and/or compound-loaded carbons, lead-acid batteries were produced in the same manner as in Example 1, and measured for high-efficiency charging characteristic. The charging voltages Vc in Table 10 show the high-efficiency charging characteristics of the resultant batteries. In each of the batteries, the charging voltage Vc was lower than 45 V and the high-efficiency charging characteristic was good. Particularly in the furnace blacks having a total content of Ni, Cu, Zn and Mn more than 1 ppm but less than 1,000 ppm, the charging voltages Vc were lower than 43.2 V and the high-efficiency charging characteristics were further superior.

Thus, according to the present invention, a lead-acid battery of superior high-efficiency charging characteristic can be obtained by using a carbon containing a simple substance or a compound, both having a catalysis. There can also be obtained a carbon material for use in a lead-acid battery of strikingly improved charging acceptability.

It should be further understood by those skilled in the art that the foregoing description has been made on embodiments of the invention and that various changes and modifications may be made in the invention without departing from the spirit of the invention and the scope of the appended claims.

What is claimed is:

1. A lead-acid battery comprising a cathode, an anode and an electrolytic solution, wherein into the anode is added an active carbon or a carbon black or a mixture thereof containing at least one simple substance selected from the group consisting of Cu, Ni, Zn, Mn, Al, Si, and Mg, or at least one compound thereof, and the simple substance or the compound has an average primary particle diameter of 0.1 to 1,000 nm, and wherein fine particles of the simple substance or the compound are supported by the active carbon or the carbon black or the mixture thereof, and wherein the active carbon or the carbon black or the mixture thereof is a catalyst carrier, and wherein the active carbon is an active carbon produced from coconut husk, and the carbon black is a furnace black, and wherein fine particles of the simple substance or the compound are dispersed on a surface of the active carbon, the carbon black or the mixture thereof.

2. A lead-acid battery according to claim 1, wherein the active carbon is an active carbon produced from coconut husk, having a Cu content of more than 5 ppm by weight but less than 15,000 ppm by weight.

3. A lead-acid battery according to claim 1, wherein the carbon black is a furnace black having a total content of Ni,

TABLE 10

| | Cu (ppm) | Ni (ppm) | Mn (ppm) | Al (ppm) | Si (ppm) | K (ppm) | Zn (ppm) | Charging voltage Vc (V) |
|---|---|---|---|---|---|---|---|---|
| Carbon black (furnace black) | 1050 | 520 | 360 | <1 | <1 | 28 | <1 | 44.7 |
| Carbon black (furnace black) | 110 | 30 | 450 | 510 | <1 | 155 | 310 | 43.1 |
| Carbon black (acetylene black) | <1 | <1 | <1 | <1 | 13 | <1 | <1 | 44.5 |
| Carbon black (furnace black) | 50 | 40 | 100 | <1 | <1 | <1 | 12 | 43.1 |
| Carbon black (furnace black) | 19 | 1 | <1 | 4 | <1 | <1 | <1 | 43.1 |
| Carbon black (furnace black) | <1 | 8 | <1 | <1 | <1 | <1 | <1 | 43.1 |

Cu, Zn and Mn more than 1 ppm by weight but less than 1000 ppm by weight.

4. A lead-acid battery according to claim 1, wherein said coconut husk has a Cu content of more than 5 ppm by weight but less than 15,000 ppm by weight.

5. A lead-acid battery according to claim 1, wherein said furnace black has a total content of Ni, Cu, Zn and Mn more than 1 ppm by weight but less than 1,000 ppm by weight.

* * * * *